(12) United States Patent
Shafer

(10) Patent No.: US 11,277,070 B1
(45) Date of Patent: Mar. 15, 2022

(54) DC-DC CONVERTER WITH EXTENDED LIGHT LOAD OPERATING RANGE, AND METHOD OF USING SAME

(71) Applicant: Vitesco Technologies USA, LLC, Auburn Hills, MI (US)

(72) Inventor: Daniel William Shafer, Mussey Township, MI (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 0 days.

(21) Appl. No.: 17/020,026

(22) Filed: Sep. 14, 2020

(51) Int. Cl.
*H02M 3/335* (2006.01)
*H02M 3/00* (2006.01)
*H02M 1/14* (2006.01)
*H02M 1/00* (2006.01)

(52) U.S. Cl.
CPC ......... *H02M 3/33569* (2013.01); *H02M 3/01* (2021.05); *H02M 3/33573* (2021.05); *H02M 1/0032* (2021.05); *H02M 1/14* (2013.01)

(58) Field of Classification Search
CPC ...... H02M 1/14; H02M 1/007; H02M 1/0032; H02M 1/0058; H02M 3/335; H02M 3/33569; H02M 3/01; H02M 3/33573
See application file for complete search history.

(56) References Cited

U.S. PATENT DOCUMENTS

| 2014/0056034 | A1* | 2/2014 | Hyeon | H02M 3/33576 363/21.02 |
| 2014/0160799 | A1* | 6/2014 | Gu | H02M 3/3376 363/17 |
| 2016/0001665 | A1* | 1/2016 | Kim | H02M 3/337 320/109 |
| 2016/0294294 | A1* | 10/2016 | Ye | H02M 3/33592 |

\* cited by examiner

*Primary Examiner* — Gary L Laxton

(57) ABSTRACT

A DC-DC converter includes a bridge circuit, a resonant tank circuit coupled to an output of the bridge circuit; a rectifier circuit having an input coupled to the resonant tank circuit and an output, and an output filter coupled to the output of the rectifier circuit. A controller is coupled to the bridge circuit, the resonant tank circuit and the output of the DC-DC converter. The controller is configured to control a switching frequency of the bridge circuit to operate the DC-DC converter as a boost converter and a buck converter. When the DC-DC converter is operating as a buck converter, the controller controls the rectifier circuit to selectively block energy transfer from the rectifier circuit to the converter output based upon an output current of the DC-DC converter being greater than current demand thereof, thereby reducing output current of the DC-DC converter and extending an operating range thereof.

14 Claims, 6 Drawing Sheets

DC-DC CONVERTER WITH EXTENDED LIGHT LOAD OPERATING RANGE, AND METHOD OF USING SAME

FIELD OF INVENTION

The present invention generally relates to a DC-DC converter, and particularly to a DC-DC converter with an extending operating range for light loading.

BACKGROUND

DC-DC converters, which convert an input DC voltage to an output DC voltage, have application in, for example, electric vehicles as part of battery charging system in which the converter is powered by large high voltage batteries that require recharge from the grid. For personal safety from electric shock hazards, galvanic isolation from the grid to the high voltage battery is required. This galvanic isolation requirement is fulfilled by magnetically coupled coils. To transfer energy in this magnetic circuit, a DC source is excited by a transistor bridge circuit. The DC source is provided by a power factor correction (PFC) circuit that converts the AC grid voltage to a 400 V DC source. Grid voltage limits this DC source to a worst case voltage of 375 V.

The electric battery voltage range can be anywhere from 200 V to 500 V depending on the series and parallel combination of the individual battery cells. The battery charging system is typically required to provide a constant DC current to the battery stack. A separate battery controller monitors the battery voltage and the individual cell temperatures and commands a charging current that is appropriate for a specific battery state of charge.

One limitation for some resonant converter topologies is voltage range, especially at low load conditions. For some battery charging systems, this limitation is mitigated by the turns ratio and inductance ratio design parameters. Broadly speaking, the transformer turns ratio sets the approximate minimum voltage capability while the ratio between the magnetizing inductance and series resonant inductance determines the gain of the tank circuit for maximum battery voltage charging. For a primary to secondary coil turns ratio of 2:1, the 400 V DC link source may operate down to the certain battery state of charge and maintain zero voltage switching (ZVS) in the bridge transistors even for a relatively low current. This is because the primary side current at this operating point is dominated by the magnetizing current. Magnetizing current is intentionally high from the low magnetizing inductance used to set the tank gain. However, as the switching frequency increases above the resonant frequency of the tank circuit, the peak magnetizing current is reduced and ZVS is lost. This is the buck region of operation, and the resonant tank transfer function also becomes flat requiring switching frequencies higher than bridge transistor capability. FIG. 1 illustrates a normalized transfer function of the resonant tank circuit as a function of switching frequency, showing both the boost and buck regions of operation. Below the resonant frequency, the DC-DC converter operates in the boost region or mode where the resonant tank circuit operates in a discontinuous conduction mode (DCM) and ZVS is maintained so long as the energy in the resonant tank is not depleted. It is desirable to reduce this boost range because the energy lost in the power transfer increases as switching frequency decreases. Furthermore, the hold-up time on the capacitor of the resonant tank circuit eventually becomes a limitation because ZVS is lost and also the transfer function becomes nonmonotonic. This low switching frequency point of operation sets the maximum charge voltage capability. If a decision is made to reduce the minimum battery voltage or current required by the battery charging system beyond the operating range of the resonant tank circuit, the resonant tank circuit may need to be redesigned. And this range increase may only be needed to support the rare condition that the battery is in a deeply depleted state of charge.

SUMMARY

It is desirable for the battery charger to support an extended voltage range while also providing a wide range of charging current. Because AC current may increase battery cell temperatures, it is desirable for AC current components within the charging current to be minimized while the dc current is maximized. It is also desirable for a galvanically isolated DC-DC converter to have high efficiency and power density.

Example embodiments overcome shortcomings of known DC-DC converters and satisfy a need for a DC-DC converter having an extended range of operation. When the DC-DC converter forms part of battery charging system, the extended range of operation allows for charging batteries when the batteries in a deeply depleted state of charge.

According to an example embodiment, a DC-DC converter includes a bridge circuit having at least one circuit leg with a pair of switching transistors. A resonant tank circuit is coupled to an output of the at least one circuit leg of the bridge circuit. A rectifier circuit has at least one input terminal coupled to the resonant tank circuit and at least one output terminal, the rectifier circuit rectifying a signal at the output of the resonant tank circuit. An output filter includes at least one input terminal coupled to the at least one output terminal of the rectifier circuit, an output of the filter circuit being an output of the DC-DC converter. A controller has a first input terminal coupled to the output of the DC-DC converter, a second input terminal coupled to the resonant tank circuit, and first output terminals connected to control terminals of the switching transistors of the bridge circuit. The controller is configured to control a switching frequency of the bridge circuit to operate the DC-DC converter as a boost converter and a buck converter. When the DC-DC converter is operating as a buck converter, the controller is configured to control the rectifier circuit to selectively block energy transfer from the rectifier circuit to the output filter based upon an output current of the DC-DC converter being greater than current demand thereof. This energy transfer blocking thereby reduces the output current of the DC-DC converter and thereby extends an operating range thereof.

The DC-DC converter further includes a power transistor connected to the rectifier circuit along at least one current path therein. The controller includes a second output terminal coupled to a control terminal of the power transistor. The controller turns off the power transistor for a period of time that is based upon the output current of the DC-DC converter and upon a setpoint current level, the setpoint current level being based upon the current demand of the output current of the DC-DC converter.

The resonant tank circuit is in a discontinuous conduction mode (DCM) when the power transistor is turned off. The controller turns off the power transistor in response to the current level in the resonant tank circuit reaching a first predetermined current value to maintain zero voltage switching. Following the power transistor being turned off, the controller turns on the power transistor upon an output current of the DC-DC converter reaching the setpoint current level. The controller controls the power transistor to turn on while maintaining zero current switching.

In one aspect, the resonant tank circuit includes an LLC resonant tank circuit including a capacitor having a first terminal coupled to the output of the at least one circuit leg, and a first inductor. The DC-DC converter further includes a transformer having a primary winding and a secondary winding, with the primary winding forming part of the resonant tank circuit, and the first inductor is coupled between the capacitor and the primary winding of the transformer.

In one aspect, the bridge circuit includes a full bridge circuit and the at least one circuit leg comprises a pair of circuit legs. The rectifier includes a full wave rectifier connected to end terminals of the secondary winding.

The DC-DC converter includes a sense resistor coupled to an output terminal of the DC-DC converter. The sense resistor is coupled to a third input terminal of the controller.

BRIEF DESCRIPTION OF THE DRAWINGS

Aspects of the invention will be explained in detail below with reference to exemplary embodiments in conjunction with the drawings, in which.

DETAILED DESCRIPTION

The following description of the example embodiment(s) is merely exemplary in nature and is in no way intended to limit the invention, its application, or uses. In the figures and throughout the detailed description, the same reference numbers are used to identify identical or similar elements. For the sake of clarity, the elements are not shown to scale unless otherwise specified.

The example embodiments are generally directed to a DC-DC converter having an expanded range of operation without increasing modulation frequency. Specifically, the example embodiments allow for the DC-DC converter to operate as a buck converter and as a boost converter. With respect to operating as a buck converter, the DC-DC converter selectively and temporarily blocks the transfer of energy to the output of the converter, thereby reducing converter output current, resulting in the DC-DC converter being in a discontinuous conduction mode and thereby operating in an extended range of operation.

Figure 1:
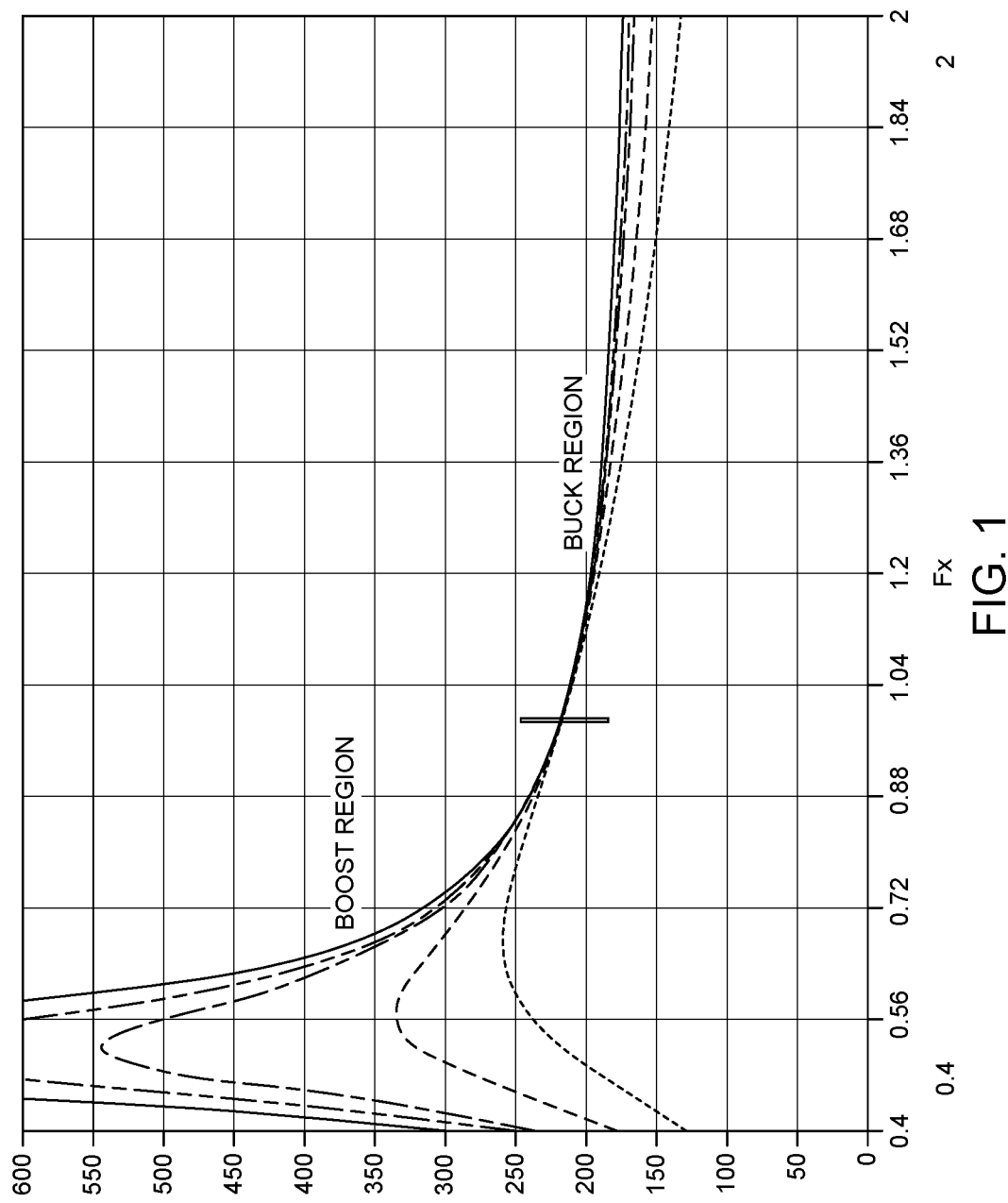
FIG. 1 is a graph illustrating boost and buck operating regions of a conventional DC-DC converter as resonant tank circuit transfer function based upon switching frequency.
Figure 2:
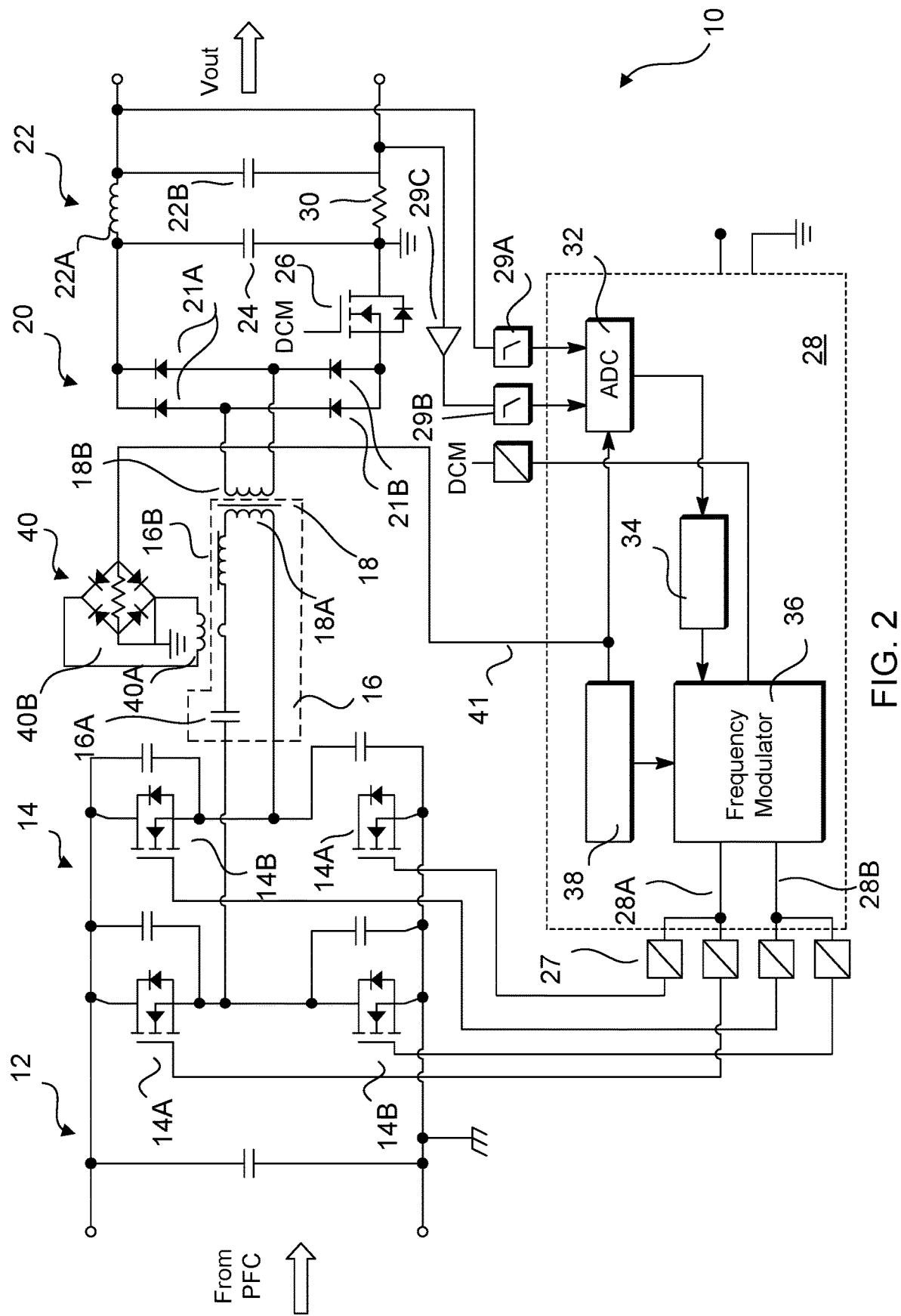
FIG. 2 is a schematic diagram of a DC-DC converter according to an example embodiment.

FIG. 2 is a block diagram a DC-DC converter 10 according to an example embodiment. DC-DC converter 10 converts an input DC voltage to an output DC voltage. DC-DC converter 10 is configured to operate as a boost converter to provide at its output an elevated or boosted voltage relative to the input voltage received, and as a buck converter to provide at the converter output a DC voltage that is lower than the DC input voltage received. One application of DC-DC converter 10 is in a battery charging system for charging the battery or batteries in a motor vehicle. The battery or batteries of such motor vehicle may provide propulsion thereto. When used as part of such motor vehicle battery charging system, DC-DC converter 10 receives at its input the output of a PFC and/or an AC-DC converter (not shown), which provides connection to the AC mains.

In the illustrated embodiment, DC-DC converter 10 includes an input filter circuit 12 which is coupled across the input terminals of DC-DC converter 10. Input filter circuit 12 is a capacitor which smooths the signal received at the input of DC-DC converter 10. It is understood that input filter circuit 12 may have different configurations and/or include additional electrical or electronic components. A bridge circuit 14 is connected to input filter circuit 12 and coupled across the input of DC-DC converter 10. Bridge circuit 14 is illustrated as a full bridge circuit having a first circuit leg 14A and a second circuit leg 14B. Each of first circuit leg 14A and second circuit leg 14B includes a high-side switching transistor and a low-side switching transistor connected between the input terminals of DC-DC converter 1. The control terminal of each high-side transistor and low-side transistor is coupled to receive an input control signal. In an alternative embodiment, bridge circuit 14 is a half bridge circuit including a single circuit leg.

DC-DC converter 10 further includes a resonant tank circuit 16 having input terminals coupled to the output terminals of bridge circuit 14 such that first circuit leg 14A passes current through resonant tank circuit 16 in a first direction and second circuit leg 14B passing current through resonant tank circuit in a second, opposite direction. In the example embodiment illustrated in FIG. 4, resonant tank circuit 16 is a resonant LLC tank circuit including a capacitor 16A and a series-connected inductor 16B. A transformer 18 includes a primary winding 18A series connected with capacitor 16A and inductor 16B for forming resonant tank circuit 16, and a secondary winding 18B coupled to primary winding 18A. Transformer 18 provides galvanic isolation between the AC mains and the output terminals of DC-DC converter 10.

Though resonant tank circuit 16 is an LLC tank circuit as shown, it is understood that resonant tank circuit 16 may have different implementations. For example, resonant tank circuit 16 may be an LCC or CLL resonant tank circuit. These different implementations may include resonant tank elements of transformer 18. In one example embodiment, inductor 16B is part of transformer 18 and in particular, inductor 16B is the leakage inductance of transformer 18 as part of an LLC, LCC or CLL resonant tank implementation.

With continued reference to FIG. 2, a rectifier circuit 20 has input terminals coupled to secondary winding 18B. Rectifier circuit 20 rectifies the voltage appearing across secondary winding 18B and provides a rectified signal at the output of rectifier circuit 20. In the illustrated example embodiment, rectifier circuit 20 is a full wave rectifier circuit having input terminals connected to the ends of secondary winding 18B. Each end of secondary winding 18B is coupled between a pair of series-connected diodes 21A, 21B. Specifically, each end of secondary winding 18B is coupled to the anode of diode 21A and to the cathode of diode 21B of the series-connected diode pair, with the cathode of diodes 21A connected together at one output terminal of rectifier circuit 20 and the anode of diodes 21B connected together at a second output terminal thereof. It is understood that rectifier circuit 20 may connect along different portions of secondary winding 18B. Further, rectifier circuit 20 may be a full-wave rectifier circuit but having any one of a number of different, known implementations. It is further understood that rectifier 20 may be implemented as a half-wave rectifier in which, for example, a single diode is coupled to an end of secondary winding 18B.

DC-DC converter 10 further includes an output filter circuit 22 which serves to filter unwanted ripple and noise from the output of rectifier circuit 20. Output filter circuit 22 is connected across an output capacitor 24 of DC-DC converter 10. As shown in FIG. 2, output filter circuit 22 includes an input terminal coupled to an output terminal of rectifier circuit 20. In one implementation, output filter circuit 22 includes a first order LC filter including an inductor 22A series-connected with a capacitor 22B, with the output of DC-DC converter 10 taken across capacitor 22B. It is understood that output filter circuit 22 may have different implementations and/or use different and/or additional electrical or electronic components to perform a signal filtering function.

DC-DC converter 10 further includes transistor 26 which is connected to and/or disposed within rectifier circuit 20. Transistor 26 is connected within the current path of each circuit path having series-connected diodes 21A, 21B. In the example embodiment shown in FIG. 4, transistor 26 is connected between diodes 21B and ground in each rectifier circuit path. It is understood that, alternatively, transistor 26 may be connected elsewhere in the current paths of rectifier circuit 20.

DC-DC converter 10 further includes a current measurement circuit 40 which senses current on the primary side of transformer 18 and provides a sensed current signal 41 at its output. In one example implementation illustrated in FIG. 2, current measurement circuit includes an inductor 40A connected to a rectifier circuit 40B. DC-DC converter 10 further includes a sense resistor 30 disposed between the negative output terminal of DC-DC converter 1 and ground. By providing to controller 28 the ungrounded terminal of sense resistor 30, controller 28 is able to determine the output current of DC-DC converter 10.

DC-DC converter 10 includes a controller 28 configured to control DC-DC converter 10 in various modes of operation. As shown in FIG. 2, controller 28 includes a first input terminal coupled, via a filter circuit 29A, to the positive output terminal of DC-DC converter 10; and a second input terminal coupled, via a differential amplifier circuit 29C and a filter circuit 29B, to the negative output terminal of DC-DC converter 10. In general, based in part upon the output of DC-DC converter 10, controller 26 generates at output terminals 28A-28B (which are coupled to the control or gate terminals of the switching transistors in circuit legs 14A and 14B of bridge circuit 14) control signals for controlling bridge circuit 14. The control signals at output terminals 28A-28B are, in one embodiment, pulse-width modulated (PWM) signals. Output terminals 28C-28F are connected to circuit legs 14A and 14B via signal conditioning and/or level shifting circuits 27.

In the example embodiment illustrated in FIG. 2, controller 28 includes an analog-to-digital converter (ADC) circuit 32 which receives the filtered voltages across each of the output terminals of DC-DC converter 1 and generates a digital output signal. The output of ADC circuit 32 is provided to a compensation/filter block 34 which filters the digital output of ADC circuit 32 to limit the amount of overshoot and undershoot. The output of compensation/filter block 34 is provided to a frequency modulator circuit 36 which also receives the output of a comparator 38 which receives at its input the output current signal 41 from current measurement circuit 40. Frequency modulator circuit 36 may utilize an enhanced pulse-width modulation (ePWM) topology. Based upon the output current of DC-DC converter 1 as measured across sense resistor 30, amplified by differential amplifier 29C and filtered by filter 29B, frequency modulator circuit 36 generates at its output terminals the control signals which are applied to the control terminals of the high-side and low-side switches of circuit legs 14A and 14B of bridge circuit 14.

Controller 28 may be implemented as a microcontroller including one or more processor circuits and memory (non-volatile, volatile or both nonvolatile and volatile) having stored therein instructions which, when executed by the one or more processor circuits, controls DC-DC converter 10 to provide a DC voltage output. In one implementation, controller 28 is a digital signal processor circuit. Controller 28 controls the operation of DC-DC converter 10 so that the converter operates in the boost and buck modes or regions of operation. Operating in both boost and buck modes provide a relatively wide operating range for the output of DC-DC converter 10.

Figure 3:
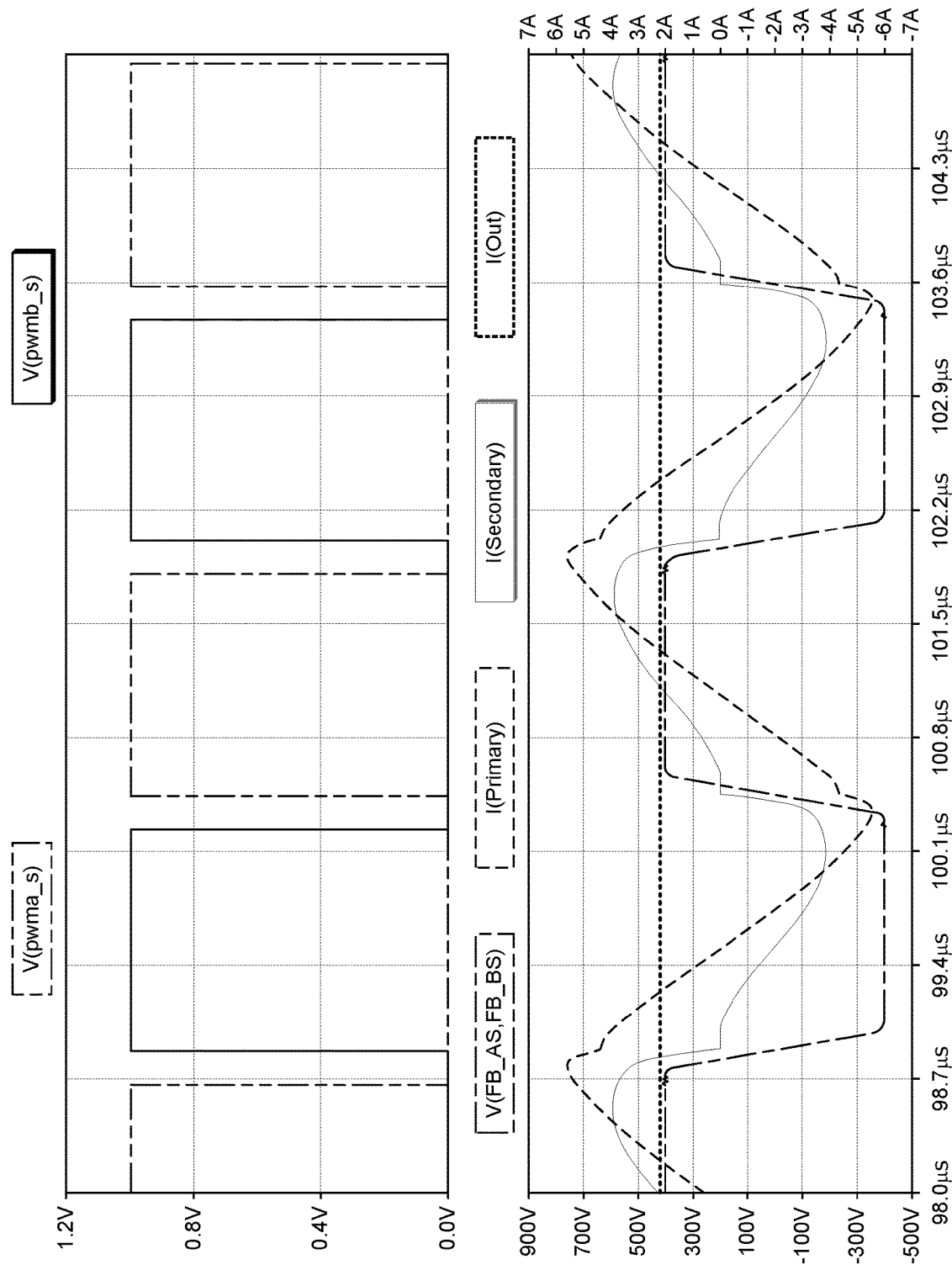
FIG. 3 is a set of waveforms illustrating the DC-DC converter of FIG. 2 operating in a normal buck mode of operation at a first output voltage.

FIG. 3 illustrates the operation of DC-DC converter 1 when operating as a buck converter in CCM. The upper waveforms are voltages of the control signals generated by frequency modulator circuit 36 and applied to the two circuit legs 14A, 14B of bridge circuit 14. The lower waveforms include the current in primary winding 18A, the current in secondary winding 18B and the output current at the output of DC-DC converter 1. Turning on one circuit leg 14A or 14B while the other circuit leg is turned off causes current in primary winding 18A to either rise or fall. With rectifier circuit 20 rectifying the current in the secondary winding 18B, the current at the output of DC-DC converter 1 is about 2 A DC at the output voltage of 185 V.

In addition to normal operation as a boost converter and as a buck converter, controller 28 controls DC-DC converter 10 in an extended range of operation. When DC-DC converter 10 is used as part of battery charging system for charging the batteries of a motor vehicle, this extended operating range better ensures effective charging of the vehicle batteries which have been significantly discharged.

Specifically, when DC-DC converter 10 is operating as a buck converter in which the output voltage of the converter is less than the voltage at the converter input, transistor 26 remains turned on and DC-DC converter 10 is in a continuous conduction mode (CCM). However, if the output current demanded by the load of DC-DC converter 10 is less than the current provided by DC-DC converter 10 at the converter output, as seen across sense resistor 30 and determined by controller 28, by at least a predetermined amount, controller 28 operates DC-DC converter 10 in a discontinuous conduction mode (DCM) in which a reduced current is provided at the output terminals of DC-DC converter 10. This is accomplished by selectively turning on and off transistor 26 during this time in DCM.

Figure 4:
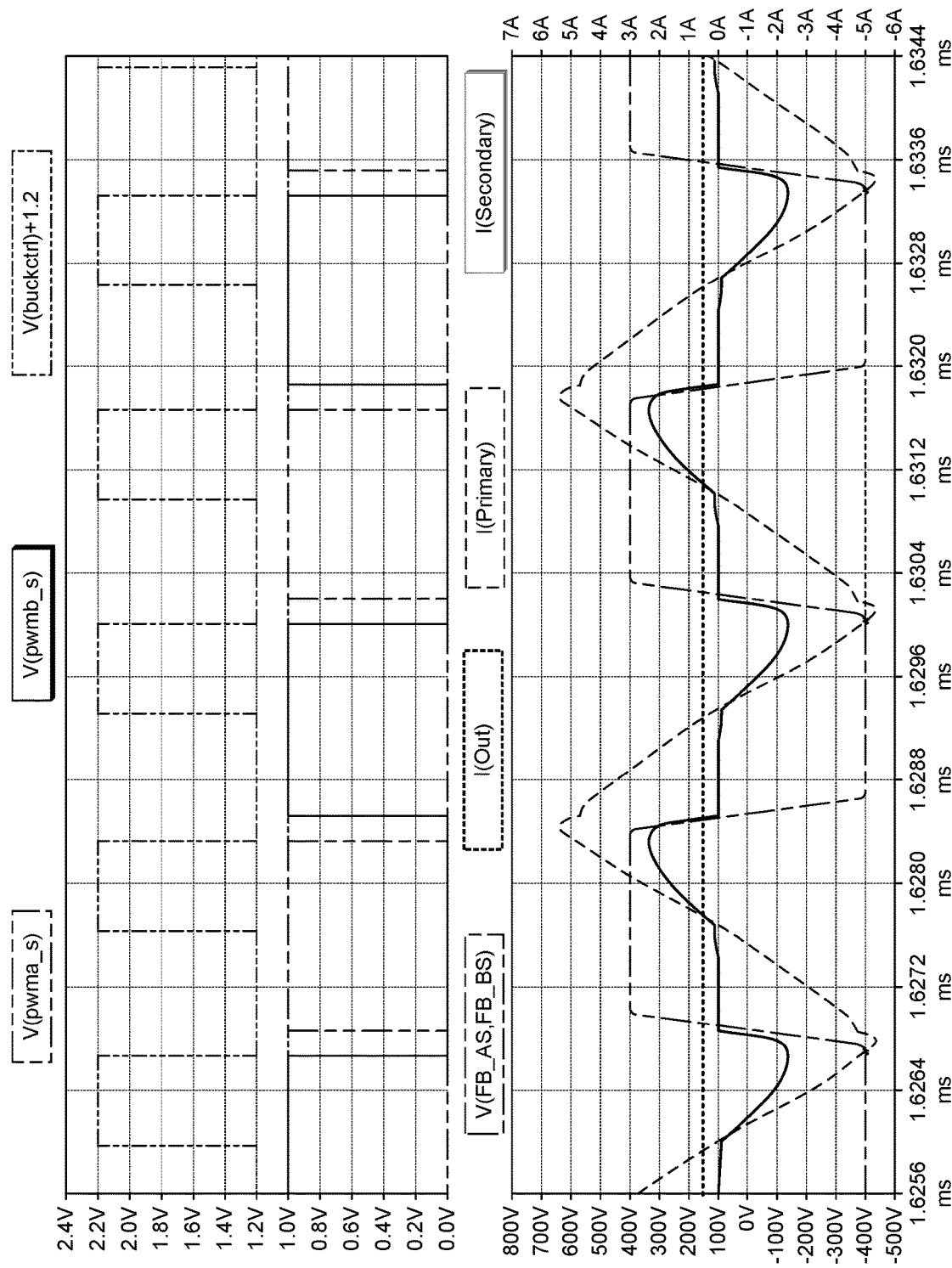
FIG. 4 is a set of waveforms illustrating the DC-DC converter of FIG. 2 operating in an extended buck mode of operation at the first output voltage.

FIG. 4 illustrates the operation of DC-DC converter 1 when operating as a buck converter in this expanded operating mode which occurs when the output current demanded by the load of DC-DC converter 10 is less than the current provided by DC-DC converter 10 at the converter output by at least a predetermined amount. The operation of DC-DC converter 1 in CCM as a buck converter as illustrated in FIG. 3, and the operation of the converter in DCM as a buck converter as illustrated in FIG. 4 are at the same output voltage (185 V) and the same switching frequency for full bridge circuit 24 (300 kHz). During operation, transistor 26 is selectively turned on and off and the amount of time transistor 26 is turned off is adjusted cycle by cycle by controller 28 until the output DC current of DC-DC converter 1 is equal to a setpoint current value, which may be based upon the output current demand. In a given cycle, transistor 26 is synchronized to turn off when a desired or predetermined current in the primary side of DC-DC converter 1 is reached, in order to maintain zero voltage switching (ZVS). The transistor stays off for the desired modulation time. This off time duration is set by controller 28 and is based on the output current of DC-DC converter 1 and the output current setpoint. After having been turned off, the current in the secondary side of transformer 18, i.e., through secondary winding 18B, is zero, so turning on transistor 26 results in zero current switching (ZCS) and switching losses are reduced or otherwise minimized.

The top-most waveform in FIG. 4 is the voltage at the control terminal of transistor 26, and the middle set of waveforms are the control signals for the two circuit legs 14A and 14B of bridge circuit 14. The lower set of waveforms of FIG. 4 include the current in primary winding 18A, the current in secondary winding 18B and the output current of DC-DC converter 1. Transistor 26 is turned off when the desired/predetermined current is reached on the primary side of transformer 18 in order to maintain ZVS. Specifically, transistor 26 turns off when the activated one of circuit leg 14A and 14B is switched off. Responsive to transistor 26 being turned off, current in the secondary winding 18B of transformer 18 goes to zero and no energy is transferred by rectifier circuit 20 to output filter circuit 22. Transistor 26 remains off for a predetermined time, at which point transistor 26 is turned on by controller 28. Transistor 26 remains turned on until the next activated circuit leg 14A or 14B turns off. Referring again to FIG. 4, the current of secondary winding 18B is nonzero only when transistor 26 is turned on. Selectively turning off transistor 26 thus reduces the output current of DC-DC converter 1. With the output voltage of DC-DC converter 10 being 185 V in FIG. 4, the output current of the converter is 0.5 A, well below the 2 A converter output current with DC-DC converter 10 in CCM as seen in FIG. 3, thereby providing an extended operating range for the converter. This extended operating range extends the output voltage of DC-DC converter 10 and allows for charging a battery or other device at relatively low output voltage current levels which would not be otherwise available while maintaining AVS or ACS so that switching losses are reduced or otherwise minimized.

Figure 5:
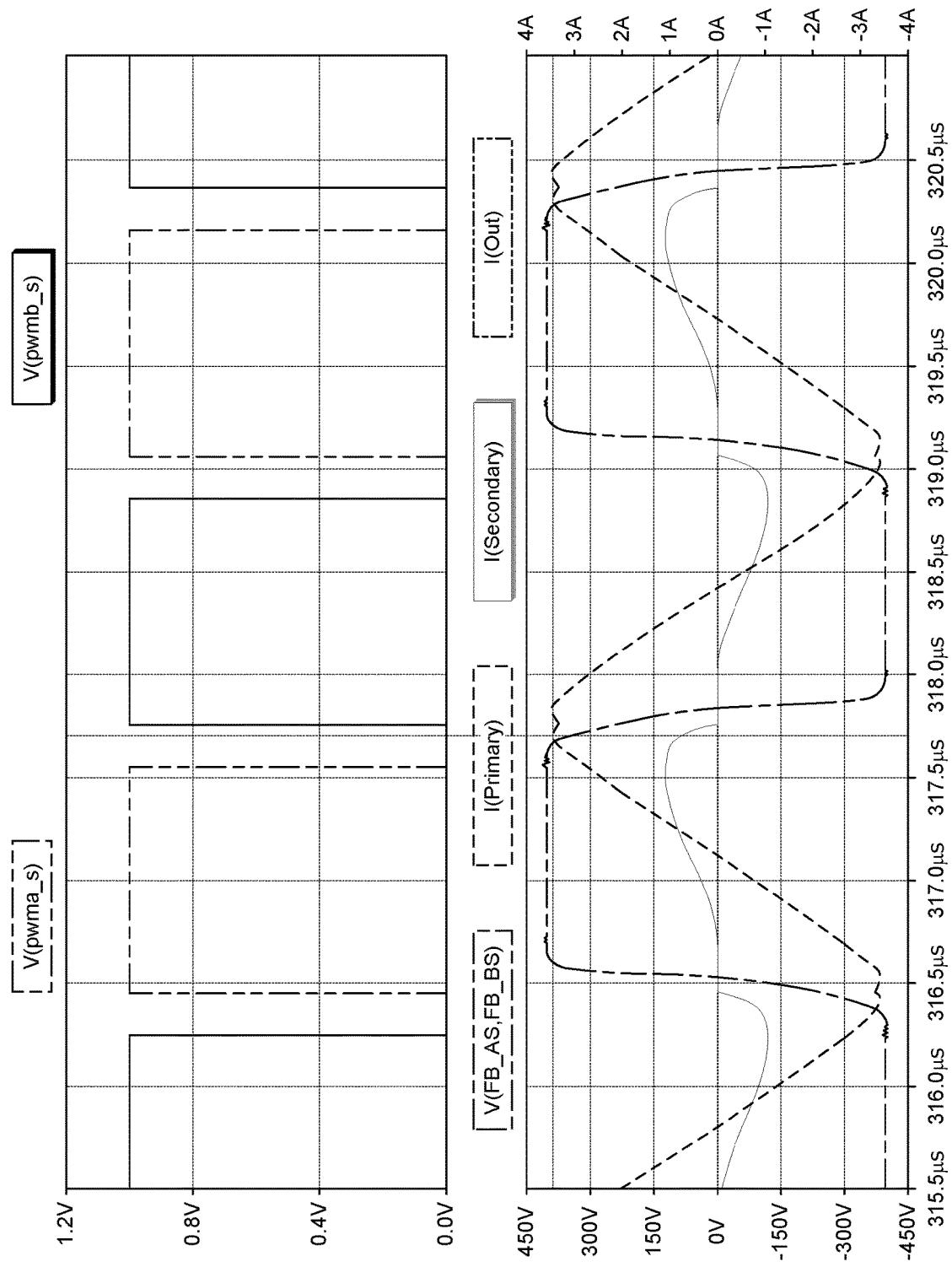
FIG. 5 is a set of waveforms associated with the DC-DC converter of FIG. 2 operating in the normal buck mode of operation.

To achieve the same low charging current (0.5 A) at the output of DC-DC converter 10 as provided in the extended operating mode but using the normal (standard) CCM requires 385 kHz switching frequency as shown in FIG. 5. Here, DC-DC converter 1 has only 3.4 A on the primary side of transformer 18 for ZVS, compared to the extended buck mode of operation of FIG. 4 having 4.8 A on the primary side for ZVS.

Figure 6:
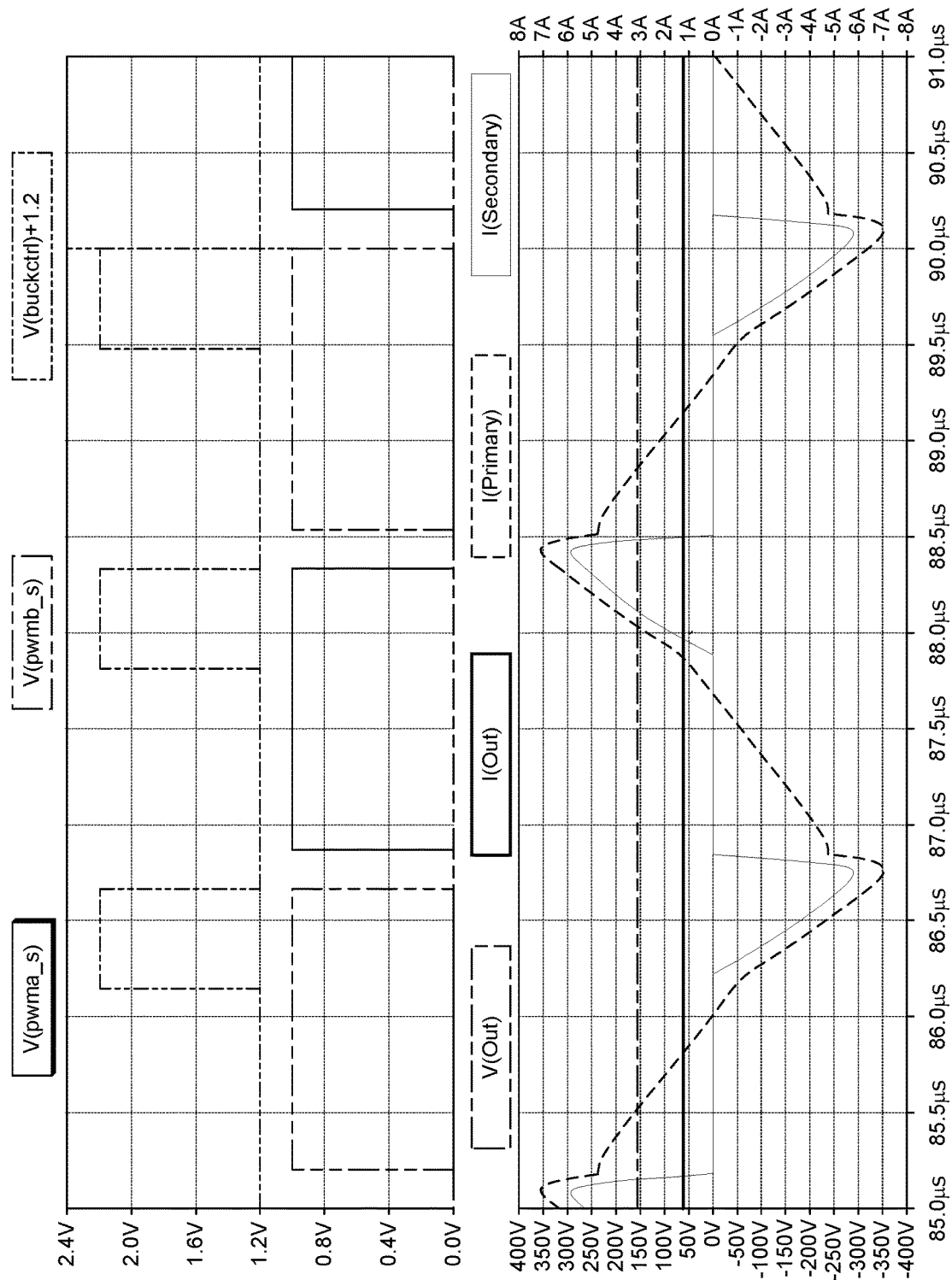
FIG. 6 is a set of waveforms illustrating the DC-DC converter of FIG. 2 operating in the extended buck mode of operation at a second output voltage.

FIG. 6 illustrates operation of DC-DC converter 1 at 150 V output in the extended operating mode, well beyond the frequency range of the normal (standard) CCM as a buck converter. Here, the extended operating mode operates down to 1.3 A of output current of the converter while maintaining 7 A of ZVS on the primary side of transformer 18.

In the example embodiment, during normal boost operation the transistor 26 is on 100% of the time and the power dissipation is a manageable 25 W. Therefore, the penalty for inserting this range-extending transistor 26 is about 0.45% in efficiency. The efficiency drop at the maximum battery voltage (i.e., about 475 V) is about 0.5% below the peak efficiency (near the resonant frequency) due to the extra magnetizing current. With transistor 26 in place, the efficiency drop is reduced by 0.5% efficiency by reducing and/or minimizing the boost region and using more of the voltage range available in the extended buck region.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

What is claimed is:

1. A DC-DC converter, comprising:
    a bridge circuit comprising at least one circuit leg having at least two switching transistors;
    a resonant tank circuit coupled to an output of the at least one circuit leg of the bridge circuit;
    a rectifier circuit having at least one input terminal coupled to the resonant tank circuit and at least one output terminal, the rectifier circuit rectifying a signal at the output of the resonant tank circuit;
    an output filter circuit having at least one input terminal coupled to the at least one output terminal of the rectifier circuit, an output of the output filter circuit comprising an output of the DC-DC converter;
    a controller having a first input terminal coupled to the output of the DC-DC converter, a second input terminal coupled to the resonant tank circuit, and first output terminals connected to control terminals of the switching transistors of the bridge circuit, wherein the controller is configured to control a switching frequency of the bridge circuit to operate the DC-DC converter as a boost converter and a buck converter, and when the DC-DC converter is operating as a buck converter, to control the rectifier circuit to selectively block energy transfer from the rectifier circuit to the output filter based upon an output current of the DC-DC converter being greater than current demand thereof, the energy transfer blocking reducing output current of the DC-DC converter and extending an operating range thereof; and
    a power transistor connected to the rectifier circuit along at least one current path therein, wherein the controller includes a second output terminal coupled to a control terminal of the power transistor, the controller turning off the power transistor for a period of time that is based upon the output current of the DC-DC converter and upon a setpoint current level, the setpoint current level being based upon a current demand of the output current of the DC-DC converter,
    wherein the controller turns off the power transistor in response to the current level in the resonant tank circuit reaching a first predetermined current value to maintain zero voltage switching.

2. The DC-DC converter of claim 1, wherein the resonant tank circuit is in a discontinuous conduction mode (DCM) when the power transistor is turned off.

3. The DC-DC converter of claim 1, wherein following the power transistor being turned off, the controller turns on the power transistor upon an output current of the DC-DC converter reaching the setpoint current level.

4. The DC-DC converter of claim 1, wherein the controller controls the power transistor to turn on while maintaining zero current switching.

5. The DC-DC converter of claim 1, wherein the resonant tank circuit comprises an LLC resonant tank circuit including a capacitor having a first terminal coupled to the output of the at least one circuit leg, and a first inductor, and the DC-DC converter further comprises a transformer having a primary winding and a secondary winding, the primary winding forming part of the resonant tank circuit, and the first inductor is coupled between the capacitor and the primary winding of the transformer.

6. The DC-DC converter of claim 1, wherein the bridge circuit comprises a full bridge circuit and the at least one circuit leg comprises a pair of circuit legs.

7. The DC-DC converter of claim 1, further comprising a transformer having a primary winding and a secondary winding, wherein the primary winding forming part of the resonant tank circuit, and wherein the rectifier comprises a full wave rectifier connected to end terminals of the secondary winding.

8. The DC-DC converter of claim 1, further comprising a sense resistor coupled to an output terminal of the DC-DC converter, the sense resistor being further coupled to a third input terminal of the controller.

9. A method of controlling a DC-DC converter comprising a resonant tank circuit, a bridge circuit having at least one output terminal coupled to an input terminal of the resonant tank circuit, and a rectifier circuit coupled to an output of the resonant tank circuit, the method comprising:
controlling, based upon an output of the DC-DC converter, a switching frequency of the bridge circuit so that the DC-DC converter operates as a buck converter and as a boost converter;
during a time when the DC-DC converter operates as the buck converter, selectively blocking energy for transfer from the rectifier circuit to the output of the DC-DC converter so as to extend an operating range of the DC-DC converter as a buck converter; and
turning off a power transistor for a period of time that is based upon the output current of the DC-DC converter and upon a setpoint current level, the setpoint current level being based upon a current demand of the output current of the DC-DC converter, the power transistor connected to the rectifier circuit along at least one current path therein, wherein the controller includes a second output terminal coupled to a control terminal of the power transistor, wherein the power transistor is turned off in response to the current level in the resonant tank circuit reaching a first predetermined current value to maintain zero voltage switching.

10. The method of claim 9, wherein the energy blocking is performed responsive to an output current of the DC-DC converter being greater than current demand for the output current.

11. The method of claim 10, wherein the energy blocking ends responsive to a current level at an output of the DC-DC converter reaching a setpoint current level, the setpoint current level being based upon the current demand.

12. The method of claim 11, wherein DC-DC converter comprises a transistor coupled within a current path of the rectifier circuit, and the energy blocking comprises selectively turning off the transistor so as to open a current path in the rectifier circuit.

13. The method of claim 12, wherein the resonant tank circuit includes a transformer having a primary winding and a secondary winding, wherein when the transistor is turned on, the current path is closed and the rectifier circuit rectifies a signal appearing across the secondary winding and transfers energy to the output of the DC-DC converter.

14. The method of claim 13, wherein the transistor is turned off to maintain zero voltage switching on a primary side of the transformer and remains off for a period of time that is based upon the output current of the DC-DC converter and the setpoint current level.

\* \* \* \* \*